United States Patent Office 3,575,983
Patented Apr. 20, 1971

3,575,983
SUBSTITUTED 1,2,3,4-TETRAHYDROISO-QUINOLINES
Willy Leimgruber, Montclair, and Fausto Eugenio Schenker, Bloomfield, N.J., assignors to Hoffmann-La Roche Inc., Nutley, N.J.
No Drawing. Filed Aug. 30, 1967, Ser. No. 664,268
Int. Cl. C07d 35/28
U.S. Cl. 260—286
3 Claims

ABSTRACT OF THE DISCLOSURE

Novel pharmacologically active 1,2,3,4 - tetrahydro-8-isoquinolinol, 1-and/or 2-(lower alkyl)-1,2,3,4-tetrahydro-8-isoquinolinols and intermediates therefor, are prepared utilizing, for example, 8-isoquinolinol as a starting material. The pharmacologically active compounds of the invention are useful as hypotensive agents.

BRIEF SUMMARY OF THE INVENTION

The invention relates to substituted 1,2,3,4 - tetrahydroisoquinolines of the formula

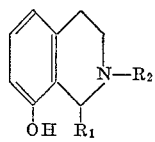

I wherein $R_1$ and $R_2$ are hydrogen or lower alkyl and acid addition salts thereof with pharmaceutically acceptable acids.

The invention further relates to novel intermediates. The compounds of Formula I are useful as hypotensive agents.

DETAILED DESCRIPTION OF THE INVENTION

The invention relates to pharmacologically active 1,2,3,4-tetrahydroisoquinolines of the formula

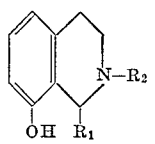

I wherein $R_1$ and $R_2$ are independently selected from the group consisting of hydrogen and lower alkyl, and acid addition salts thereof with pharmaceutically acceptable acids.

In a particularly advantageous aspect, the invention relates to the subgenus characterized by the formula

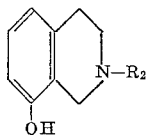

Ia wherein $R_2$ is a previously described, and acid addition salts thereof with pharmaceutically acceptable acids.

In another aspect, the invention relates to the subgenus characterized by the formula

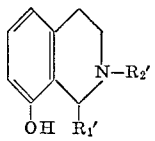

Ib wherein $R_1$ and $R_2$ are lower alkyl, and acid addition salts thereof with pharmaceutically acceptable acids.

In still another aspect, the invention relates to novel intermediates.

As used herein, the term "lower alkyl" denotes a straight or branched chain hydrocarbon group containing 1–7 carbon atoms, e.g., methyl, ethyl, propyl, isopropyl, butyl, tertiary butyl and the like; methyl is preferred.

Examples of the compounds of the invention are:

1,2,3,4-tetrahydro-8-isoquinolinol;
2-methyl-1,2,3,4-tetrahydro-8-isoquinolinol;
1-methyl-1,2,3,4-tetrahydro-8-isoquinolinol;
1,2-dimethyl-1,2,3,4-tetrahydro-8-isoquinolinol;

and acid addition salts thereof with pharmaceutically acceptable acids. Of these, the most preferred are 2-methyl-1,2,3,4-tetrahydro-8-isoquinolinol and acid addition salts thereof with pharmaceutically acceptable acids.

The compounds of Formula I form acid addition salts and such salts are within the scope of this invention. Thus, the compounds of Formula I form pharmaceutically acceptable addition salts with, for example, both pharmaceutically acceptable organic and inorganic acids, such as acetic acid, succinic acid, formic acid, methanesulfonic acid, p-toluene-sulfonic acid, hydrochloric acid, nitric acid, phosphoric acid, sulfuric acid and the like.

The compounds of Formula I are prepared according to processes illustrated by the following reaction schemes:

Scheme I

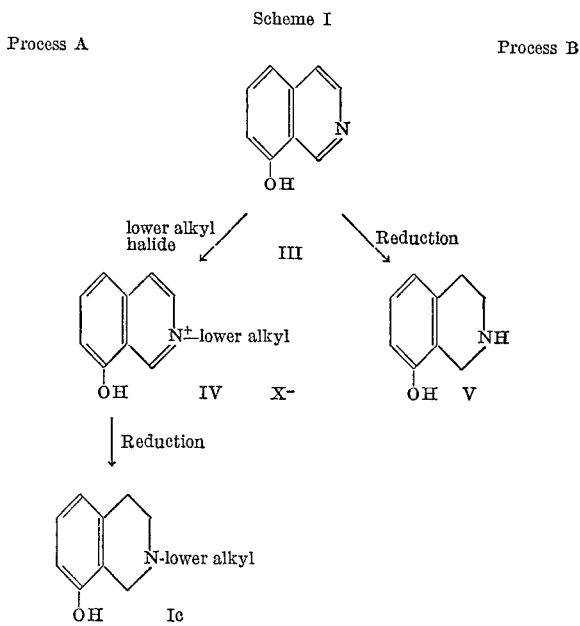

wherein halide is preferably bromide, iodide or chloride, and X⁻ is halogen, preferably bromine, iodine or chlorine.

Process A of Scheme I is carried out by reacting 8-isoquinolinol (III), a known compound, with a lower alkyl halide, such as methyl iodide, at a temperature in the range of from about 25° to about 90°, to form a compound of Formula IV. A compound of Formula IV is then reduced, for example, with sodium borohydride or with hydrogen under pressure in the presence of platinum oxide, to form the corresponding compound of Formula Ic.

Process B of Scheme I is carried out by reducing 8-isoquinolinol utilizing, for example, hydrogen under pressure in the presence of platinum oxide, to form the corresponding compound of Formula V.

Scheme II

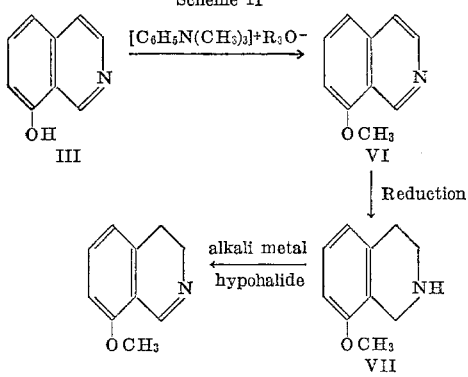

wherein $R_3$ is hydrogen or lower alkyl.

The process of Scheme II is carried out by reacting 8-isoquinolinol with phenyltrimethylammonium chloride in the presence of an alkali alkoxide, such as sodium methoxide, or an alkali metal hydroxide, such as sodium hydroxide, to form the compound of Formula VI. The compound of Formula VI is reduced, for example, with hydrogen under pressure in the presence of platinum oxide, to form the compound of Formula VII. The compound of Formula VII is reacted with an alkali metal hypohalide, such as sodium hypochloride, to yield the compound of Formula VIII.

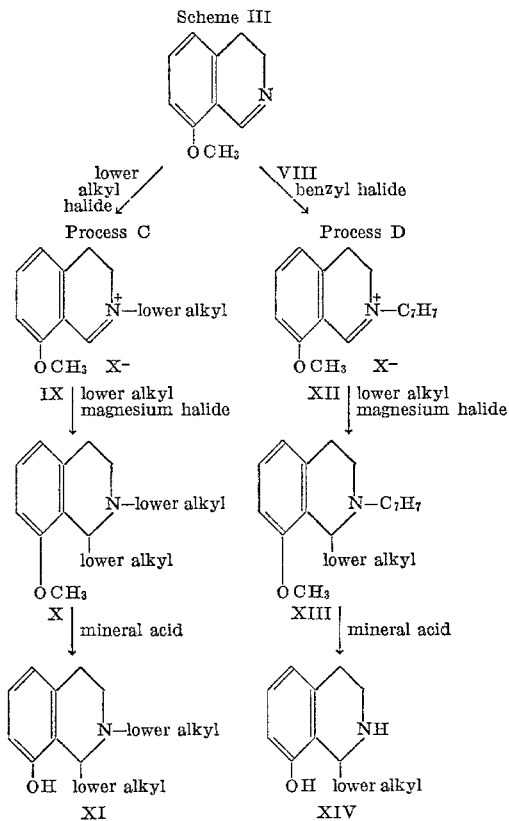

Process C of Scheme III is carried out by reacting 8-methoxy-3,4-dihydroisoquinoline (VIII), with a lower alkyl halide, such as methyl iodide, to yield a compound of Formula IX. A compound of Formula IX is reacted with a lower alkyl magnesium halide, such as methyl magnesium iodide, to form a compound of Formula X. Thereafter, a compound of Formula X is reacted with a mineral acid, such as hydrochloric or hydrobromic acid, to form the compound of Formula XI.

Process D of Scheme III is carried out by reacting 8-methoxy-3,4-dihydroisoquinoline (VIII) with a benzyl halide, such as benzyl bromide, to form a compound of Formula XII. A compound of Formula XII is reacted with a lower alkyl magnesium halide, such as methyl magnesium chloride, to form a compound of Formula XIII. Thereafter, a compound of Formula XIII is reacted with a mineral acid, such as hydrochloric or hydrobromic acid, to form a compound of Formula XIV.

All the reactions described above may be conducted in the presence of added solvent such as methanol, methylene chloride, benzene, toluene, ethanol, ether and the like. The temperatures at which the processes described above are carried out are not critical, however, temperatures in the range of about 25° C. to 80° C. are preferably utilized. The reaction products of the invention may be recovered employing conventional techniques, such as filtration, extraction and the like.

The compounds of Formula I lower blood pressure and cause vasodilation. More particularly, they effect an increase in the peripheral vascular blood flow with a decrease in peripheral vascular resistance without any substantial inhibition of the peripheral autonomic system and with only minimal blocking effects upon the adrenergic effector sites. Moreover, the compounds of Formula I posess the advantage of being devoid of certain undesirable effects, for instance, they do not significantly increase the heart rate. Thus, the compounds of the invention are useful, for example, in the treatment of vascular diseases, such as hypotension.

The blood pressure reducing properties of the compounds of Formula I can be demonstrated in warm-blooded animals, for example, in nembutalized dogs prepared for simultaneous recording of blood pressure, heart force, femoral artery blood flow and cardiac rate. In this procedure, doses of 0.5, 1.0, 2.0 and 4.0 mg./kg. of the test drug are administered intravenously to the nembutalized dogs. Nethalide, 1 mg./kg. i.v., is given 30 minutes following the dose of 4 mg./kg. Thirty minutes later, the overall response to a second administration of 4 mg./kg. of the test drug is obtained.

Illustrative of the results obtained, for example with 2-methyl-1,2,3,4-tetrahydro-8-isoquinolinol, which has an $LD_{50}$ of 440 mg./kg. p.o. in mice after 72 hours, are those set forth in Tables I, II and III.

TABLE I.—EFFECT ON BLOOD PRESSURE

| Acute Dose, mg./kg. | Min. after dose | Predose B.P., mm. Hg | Acute B.P. change, mm. Hg | Duration (minutes) | Time to next Inj. (min.) | Cardiac rate |
|---|---|---|---|---|---|---|
| 0.5 | | 165/80 | −25/−35 | 6.0 | 60 | 150-175 |
|  | 50 | 150/75 | | | | 150 |
| 1.0 | | 145/75 | −30/−35 | 20.0 | 60 | 145, 100 |
|  | 50 | 145/75 | | | | 150 |
| 2.0 | | 150/80 | −35/−30 | 20.0 | 60 | 140-170 |
|  | 50 | 155/85 | | | | 145 |
| 4.0 | | 165/90 | −35/−20 | 30.0 | 30 | 140-170 |
| Nethalide: | | | | | | |
| 1.0 | | 150/90 | −50/−35 | >30.0 | 30 | 140-95 |
| 4.0 | | 125/75 | −25/−25 | 20.0 | | 105-120 |

TABLE II.—EFFECT ON CONTRACTILE FORCE OF HEART

| Dose, mg./kg.: | Minutes after dose | Percent change from predose | Duration (minutes) |
|---|---|---|---|
| 0.5 | | +45.5 | 15.0 |
| | 50 | +9.1 | |
| 1.0 | | +63.4 | 10.0 |
| | 50 | 0 | |
| 2.0 | | +36.4 | 15.0 |
| | 50 | −27.2 | |
| 4.0 | | +36.4 | 20.0 |
| Nethalide: | | | |
| 1.0 | | −18.4 | 15.0 |
| 4.0 | | +18.4 | 15.0 |

TABLE III.—EFFECT ON BLOOD FLOW

| Dose, mg.°kg.: | Minutes after dose | Percent change from predose | Duration (minutes) |
|---|---|---|---|
| 0.5 | | +157 | 5.0 |
| | 50 | −8.9 | |
| 1.0 | | +100 | 5.0 |
| | 50 | 0 | |
| 2.0 | | +157 | 5.0 |
| | 50 | 0 | |
| 4.0 | | +157 | 5.0 |
| Nethalide: | | | |
| 1.0 | | 0 | |
| 4.0 | 50 | +122 | 5.0 |

For use as hypotensive agents, the compounds of Formula I are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizers, wetting agents, emulsifying agents salts for altering osmotic pressure buffers, etc. can be incorporated, if desired, into such formulations.

The quantity of active medicament which is present in any of the above-described dosage forms is variable. It is preferred, however, to provide capsules or tablets containing from about 10 mg. to about 50 mg. of the Formula I base or an equivalent amount of a medicinally acceptable acid addition salt thereof. For parenteral administration, it is preferred to provide a solution containing from about 1 mg./ml. to about 10 mg./ml. of the Formula I base, or an equivalent quantity of a salt thereof.

The frequency with which any such dosage form will be administered to a warm-blooded animal will vary, depending upon the quantity of active medicament present therein and the needs and requirements of the warm-blooded animal, as diagnosed by the prescribing practitioner. Under ordinary circumstances, however, up to about 250 mg./kg. of the compound can be administered daily in several oral doses. It is to be understood, however, that the dosages set forth therein are exemplary only and that they do not, to any extent, limit the scope or practice, of this invention.

The following non-limiting examples further illustrate the invention. All parts are by weight and all temperatures are in degrees centigrade, unless otherwise mentioned.

EXAMPLE 1

Preparation of 8-hydroxy-2-methylisoquinolinium iodide

A solution 3.63 g. of 8-isoquinolinol and 4 ml. of methyl iodide in 50 ml. of ethanol was stirred at reflux temperature for 8 hours, cooled and filtered to give, after recrystallization from ethanol-ethyl acetate, 8-hydroxy-2-methylisoquinolinium iodide, having a melting point of 220–221°.

EXAMPLE 2

Preparation of 2-methyl-1,2,3,4-tetrahydro-8-isoquinolinol

A solution of 2.87 g. of 8-hydroxy-2-methylisoquinolinium iodide in 200 ml. of ethanol was hydrogenated over platinum oxide at room temperature and at 50 p.s.i. pressure. The catalyst was removed by filtration and the filtrate was evaporated to dryness. The residue was dissolved in 100 ml. of methanol and treated with 516.5 mg. of sodium methylate in methanol. The solvent was evaporated under reduced pressure, and the solid residue was extracted with boiling methylene chloride. The extract was evaporated to dryness to yield 1.6 g. of 2-methyl-1,2,3,4-tetrahydro-8-isoquinolinol, M.P. 170–173.5°.

EXAMPLE 3

Preparation of 1,2,3,4-tetrahydro-8-isoquinolinol

A solution of 18 g. of 8-isoquinolinol hydrochloride in 1.2 liters of ethanol was hydrogenated with platinum oxide catalyst at room temperature and 50 p.s.i. pressure. The catalyst was removed by filtration and the solution evaporated to dryness. Recrystallization of the residue from 1 N HCl-conc. HCl (2:1) yielded 15 g. of 1,2,3,4-tetrahydro-8-isoquinolinol hydrochloride, M.P. 271–271°.

The free base 1,2,3,4-tetrahydro-8-isoquinolinol was obtained by treating a methanolic solution of the hydrochloride with sodium methoxide. The solution was evaporated to dryness and the residue extracted with methylene chloride. Evaporation of the organic extracts gave a yellowish solid which was sublimed in high vacuum at 140° C., to yield white crystals of 1,2,3,4-tetrahydro-8-isoquinolinol, M.P. 181–181.5°.

EXAMPLE 4

Preparation of 8-methoxyisoquinoline

To a solution of 29 g. of 8-isoquinolinol and 11.35 g. of sodium methylate in 175 ml. of methanol, 36.1 g. of phenyltrimethylammonium chloride were added. The mixture was stirred for one hour, filtered to remove the precipitated salt, and then evaporated under reduced pressure. The oily residue was dissolved in 150 ml. of dimethylformamide. The solution was heated at reflux for 2 hours, cooled, and then evaporated. The residue was dissolved in 250 ml. of methylene chloride and the solution was extracted with 1 N sodium hydroxide solution. The aqueous layer was extracted with methylene chloride. The organic layer was then washed with water, dried with sodium sulfate, treated with charcoal, and evaporated to dryness to give 43.2 g. of dark oil. Dimethylaniline was removed from this material by distillation at 58–89° C./17–18 mm., and the distillation residue was filtered through a column containing 10 g. of alumina II. The column was eluted with ether, and after evaporation of the eluate, 25.8 g. of light brown liquid was obtioned. Crystallization from ether-pentane gave 20.6 g. of pure 8-methoxyisoquinoline, M.P. 48–51° C.

The corresponding hydrochloride salt was prepared as follows:

A solution of 21.86 g. 8-methoxyisoquinoline in 125 ml. of methanol was acidified with ethanolic hydrogen chloride and evaporated to dryness to yield 26.8 g. of the hydrochloride salt of 8-methoxyisoquinoline as a yellowish solid, M.P. 170–170.5°.

EXAMPLE 5

Preparation of 8-methoxy-1,2,3,4-tetrahydroisoquinoline hydrochloride

A solution of 26.8 g. of 8-methoxyisoquinoline hydrochloride in 600 ml. of ethanol was hydrogenated with platinum oxide catalyst at room temperature and 50 p.s.i. of pressure. The catalyst was removed by filtration and the filtrate evaporated to dryness. The solid residue was crystallized from methanol-ether to give 17.5 g. of 8-methoxy-1,2,3,4-tetrahydroisoquinoline hydrochloride as white crystals, M.P. 260.5–263°.

EXAMPLE 6

Preparation of 8-methoxy-3,4-dihydroisoquinoline

A solution of 2.8 g. of 8-methoxy-1,2,3,4-tetrahydroisoquinoline hydrochloride in 100 ml. of methanol was neutralized with 756.5 mg. of sodium methylate in methanol. After evaporation of the solvent, the residue was extracted with ether. Removal of the solvent gave 2.23 g. of 8-methoxy-1,2,3,4-tetrahydroisoquinoline, which was dissolved in 75 ml. of methanol and stirred for 2 hours at room temperature with 6.12 ml. of a 16.6% sodium hypochlorite solution. After the addition of 6.92 g. of sodium hydroxide pellets, the reaction mixture was refluxed for 2 hours, and then evaporated to dryness. The residue was mixed with water and extracted with methylene chloride. The organic layer was washed with water, dried with sodium sulfate, treated with charcoal, and evaporated to dryness. The liquid residue was dissolved in ether, treated with Dry Ice, filtered and then evaporated to yield 2.1 g. of 8-methoxy-3,4-dihydroisoquinoline as an oil.

The hydrochloride salt was prepared as follows: A solution of 377 mg. of 8-methoxy-3,4-dihydroisoquinoline in 25 ml. of methanol was treated with charcoal and acidified with ethanolic hydrogen chloride. Removal of the solvent yielded 461 mg. of crude hydrochloride, which was crystallized from methanol-benzene and then from methylene chloride-ether to give 238 mg. of 8-methoxy-3,4-dihydroisoquinoline hydrochloride as pale yellow crystals, M.P. 175–175.5°.

EXAMPLE 7

Preparation of 8-methoxy-2-methyl-3,4-dihydroisoquinolinium iodide

A solution of 8.0 g. of 8-methoxy-3,4-dihydroisoquinoline in 250 ml. of benzene was stirred with 15 ml. of methyl iodide for 65 hours at room temperature. The reaction mixture was chilled. The solid that formed was collected by filtration and crystallized from methanol-ether to give 12.4 g. of yellow crystalline 8-methoxy-2-methyl-3,4-dihydroisoquinolinium iodide, M.P. 182–182.5°.

EXAMPLE 8

Preparation of 8-methoxy-1,2-dimethyl-1,2,3,4-tetrahydroisoquinoline hydrochloride To a concentrated ether solution of methylmagnesium iodide, prepared from 6.52 g. of magnesium and 16.7 ml. of methyl iodide, 8.12 g. of 8-methoxy-2-methyl-3,4-dihydroisoquinolinium iodide were added in small portions. The mixture was refluxed for 1.5 hours, cooled, decomposed with a saturated aqueous sodium sulfate solution, and then diluted with 200 ml. of water. The aqueous mixture was extracted with ether. The ether phase was washed with water, dried with sodium sulfate, treated with charcoal, filtered and evaporated to give 3.82 g. of 8-methoxy-1,2-dimethyl-1,2,3,4-tetrahydroisoquinoline. A solution of 535 mg. of this material in 25 ml. of ethanol was acidified with ethanolic hydrogen chloride and evaporated to dryness. The residue was crystallized from methylene chloride-ether to yield 529 mg. of 8-methoxy-1,2-dimethyl-1,2,3,4-tetrahydroisoquinoline hydrochloride, M.P. 159.5–161.5°.

EXAMPLE 9

Preparation of 1,2-dimethyl-1,2,3,4-tetrahydro-8-isoquinolinol hydrobromide

A solution of 3.7 g. of 8-methoxy-1,2-dimethyl-1,2,3,4-tetrahydroisoquinoline hydrochloride in 150 ml. of 48% hydrobromic acid was heated at reflux temperature for 8½ hours and then stirred for an additional 55 hours at room temperature. The solution was treated with charcoal, filtered, and the filtrate evaporated to dryness under reduced pressure. The residue was crystallized from methanol-ether to give 4.67 g. of the 1,2-dimethyl-1,2,3,4-tetrahydro-8-isoquinolinol hydrobromide, M.P. 211–212.5°.

EXAMPLE 10

Preparation of 1,2-dimethyl-1,2,3,4-tetrahydro-8-isoquinolinol hydrochloride

A solution of 4.67 g. of 1,2-dimethyl-1,2,3,4-tetrahydro-8-isoquinolinol hydrobromide in 50 ml. of methanol was treated with 978 mg. of sodium methylate in methanol. The solution was evaporated to dryness, and the residue was extracted with ether to give the free base 1,2-dimethyl-1,2,3,4-tetrahydro-8-isoquinolinol, which was dissolved in 50 ml. of ethanolic hydrogen chloride. After removal of the solvent, the crude residue was crystallized from methanol-ether to give 3.23 g. of 1,2-dimethyl-1,2,3,4-tetrahydro-8-isoquinolinol hydrochloride, M.P. 205–206°.

EXAMPLE 11

Capsule formulation:  Per capsule, mg.
2-methyl-1,2,3,4-tetrahydro-8 - isoquinolinol hydrochloride _____ 25
Lactose _____ 158
Corn starch _____ 37
Talc _____ 5

Total weight _____ 225

Procedure 25 parts of 2-methyl-1,2,3,4-tetrahydro-8-isoquinolinol hydrochloride were mixed with 158 parts of lactose and 37 parts of corn starch in a suitable mixer. The mixture was further blended by passing through a Fitzpatrick Comminuting Machine with a No. 1A screen with knives forward. The blended powder was returned to the mixer and 5 parts of talc were added and blended thoroughly. Thereafter, the mixture was filled into No. 4 hard shell gelatin capsules on a Parke Davis capsulating machine.

EXAMPLE 12

Capsule formulation:  Per capsule mg.
2-methyl-1,2,3,4-tetrahydro-8-isoquinolinol hydrochloride _____ 50
Lactose, U.S.P. _____ 125
Corn starch, U.S.P. _____ 30
Talc, U.S.P. _____ 5

Total weight _____ 210

Procedure 50 parts of 2-methyl-1,2,3,4-tetrahydro-8-isoquinolinol hydrochloride were mixed with 125 parts of lactose and 30 parts of corn starch in a suitable mixer. The mixture was further blended by passing through a Fitzpatrick Comminuting Machine with a No. 1A screen with knives forward. The blended powder was returned to the mixer and 5 parts of talc were added and blended thoroughly. Thereafter, the mixture was filled into No. 4 hard shell gelatin capsules on a Parke Davis capsulating machine.

EXAMPLE 13

Tablet formulation:  Per tablet mg.
2 - methyl - 1,2,3,4-tetrahydro-8-isoquinolinol hydrochloride _____ 10.0
Lactose _____ 113.5
Corn starch _____ 70.5
Pregelatinized corn starch _____ 8.0
Calcium stearate _____ 3.0

Total weight _____ 205.0

Procedure 10 parts of 2-methyl-1,2,3,4-tetrahydro-8-isoquinolinol hydrochloride were mixed with 113.5 parts of lactose, 70.5 parts of corn starch and 8 parts of pregelatinized corn starch in a suitable size mixer. The mix was passed through a Fitzpatrick Comminuting Machine fitted with No. 1A screen and with knives forward. The mix was returned to the mixer and moistened with water to a thick paste which was passed through a No. 12 screen and the moist granules were dried on paper-lined trays. The dried granules were returned to the mixer and 3 parts of calcium stearate were added and mixed well. The granules were compressed at a tablet weight of 200 mg. using standard concave punches having a diameter of 5/16'.'

What is claimed is:

1. A compound, 2-methyl-1,2,3,4-tetrahydro-8-isoquinolinol and acid addition salts thereof with pharmaceutically acceptable acids.

2. A compound in accordance with claim 1, 2-methyl-1,2,3,4-tetrahydro-8-isoquinolinol.

3. A compound in accordance with claim 1, 2-methyl-1,2,3,4-tetrahydro-8-isoquinolinol hydrochloride.

References Cited

UNITED STATES PATENTS

| | | | |
|---|---|---|---|
| 2,395,526 | 2/1946 | Woodward | 260—289X |
| 2,663,709 | 12/1953 | Craig | 260—289X |
| 3,135,759 | 6/1964 | Whittaker | 260—289X |
| 3,314,963 | 4/1967 | Koch | 260—289X |
| 3,379,730 | 4/1968 | Mathison | 260—286 |
| 3,501,477 | 3/1970 | Grethe | 260—289X |
| 3,501,478 | 3/1970 | Grethe | 260—289X |

OTHER REFERENCES

Brossi et al., Helv. Chem. Acta, vol. 47, pp. 2089–97 (1964).

DONALD G. DAVIS, Primary Examiner

U.S. Cl. X.R.

260—289; 424—258